3,145,204
THIENYL PHENYL ETHYL MORPHOLYL
CARBINOL
Roland Yves Mauvernay, Riom, France, assignor to
Laboratoire d'Analyses et de Recherches R. Y. Mauvernay, Riom (Puy-de-Dome), France
No Drawing. Filed Feb. 28, 1961, Ser. No. 92,127
Claims priority, application, France, Mar. 4, 1960,
820,425, Patent 1,306,610
4 Claims. (Cl. 260—247.1)

The present invention relates to a new compound, namely thienyl phenyl ethyl morpholyl carbinol and non-toxic quaternary ammonium salts thereof.

More particularly the invention relates to lower alkyl halide quaternary ammonium salts of thienyl phenyl ethyl morpholyl carbinol, e.g. a methyl halide quaternary ammonium salt thereof, and most particularly to the compound thienyl phenyl - ethyl - (N - methyl - morpholinium)-carbinol iodide.

It is an object of the present invention to provide for the above new compounds, for methods of producing the compounds, and for the use of such compounds. These compounds have valuable pharmacological properties as will be discussed herein.

With the above and other objects in view, the present invention mainly comprises a compound selected from the group consisting of thienyl phenyl ethyl morpholyl carbinol and non-toxic quaternary ammonium salts thereof.

The preferred quaternary ammonium salts are the lower alkylhalide quaternary ammonium salts of the thienyl phenyl ethyl morpholyl carbinol, such as the methyl halide quaternary ammonium salts, and the most preferred compound in accordance with the present invention is thienyl phenyl ethyl-(N-methyl morpholinium)-carbinol iodide.

The compound thienyl phenyl ethyl-(N-methyl morpholinium)-carbinol iodide has the following structure:

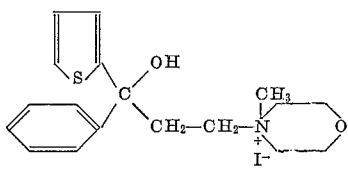

This compound is produced by reacting the amino ketone thienyl ethyl morpholyl ketone of the following structural formula:

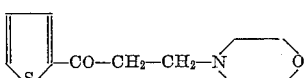

with a phenylmagnesium halide such as phenylmagnesium bromide under Grignard conditions to form the corresponding amino alcohol of the following structural formula:

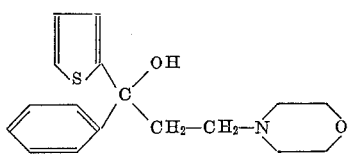

The quaternary ammonium methyl iodide salt thereof is produced simply by reaction of the thienyl phenyl ethyl morpholyl carbinol with an equimolecular weight of methyl iodide.

The following example illustrates the production of thienyl phenyl ethyl-(N-methyl morpholinium)-carbinol iodide. The scope of the invention is not, however, meant to be limited to the specific details of the example, and it is apparent that other quaternary ammonium salts can be produced in like manner.

*Example*

In a 3-neck flask protected by mercury, an ascending refrigerant under protection of calcium chloride and an ampoule of bromine there is prepared under normal Grignard reaction condition phenylmagnesium bromide from the following:

Magnesium turnings_____ 27 g. (1.1 g. atomic weights).
Bromobenzene _____ 181 g. (1.15 moles).
Anhydrous ether_____ 500 cc.

To the cold phenylmagnesium bromide solution is added a solution of:

Thienyl ethyl morpholyl ketone____ 180 g. (0.8 mole).
Anhydrous ether_____ 250 cc.

The solution of the ketone is added in such manner as to maintain the ether under constant refluxing. After all of the solution has been added the reaction mixture is heated under refluxing for 1 hour. In the course of 12 hours the temperature reaches ambient temperature.

The reaction mass is then taken up by ice and ammonium chloride according to the classical method.

The ethereal solution is treated with a solution of 2 normal hydrochloric acid. There is thus obtained the amino alcohol in the form of the chlorohydrate. The yield amounts to 60% of the theoretical. The compound is recrystallized from methanol to purify it.

The product is put into solution in water alkalinized by ammonium hydroxide and take up by ether. After evaporation of the ether there is obtained the amino alcohol in the form of the base.

The thienyl phenyl ethyl-(N-methyl morpholinium)-carbinol iodide is formed by dissolving the amino alcohol (thienyl phenyl ethyl morpholyl carbinol) in a minimum amount of anhydrous ether and treating it with an equimolecular weight of methyl iodide. There is thus obtained the thienyl phenyl ethyl-(N-methyl morpholinium)-carbinol which crystallizes out and is washed with anhydrous ether. The melting point is 189–191° C.

Pharmacological properties of the compounds of the present invention, and particularly of the thienyl phenyl ethyl-(N-methyl morpholinium)-carbinol idodide will be discussed below. One of the particular properties thereof is its potentiating action on the soporific effect of barbiturates such as barbital, phenobarbital, pentobarbital, etc., and most particularly pentobarbital. It has been found that the compounds of the present invention, and particularly thienyl phenyl ethyl-(N-methyl morpholinium)-carbinol iodide has a marked potentiating action on the soporific effect of barbiturates such as pentobarbital. This potentiating effect is obtained with even very small amounts of the thienyl phenyl ethyl-(N-methyl morpholinium)-carbinol iodide, and in general it is not necessary to use more than about 1–10% by weight of the barbiturate in order to achieve the potentiating effect.

In addition to its action in potentiating the soporific effect of barbituates such as pentobarbital the thienyl phenyl ethyl-(N-methyl morpholinium)-carbinol iodide of the present invention has other important pharmacological properties which are of great interest and make the compound extremely valuable.

One important property is the property of opposing the action of acetyl choline, which permits understanding the fact that the compound has parasympatholytic properties.

The inhibition of the parasympathetic system by the compound varies depending on the area. It is a distinct property on the cardiometric innervation and above all on the intestinalmetric. The reaction is less marked, however, on the diameter of the pupils and on the salivary secretion.

The antagonistic action to acetyl choline is gangioplegic only in relatively strong doses.

In addition the thienyl phenyl ethyl-(N-methyl morpholinium)-carbinol iodide has anti-spasmodic properties proved by the fact that it relieves the spasm caused by barium chloride on the isolated organ and, after a certain time it arrests and then moderates the spontaneous intestinal motility. It also effectively protects against histaminic asthma crisis on guinea pigs.

The $LD_{50}$ of thienyl phenyl ethyl-(N-methyl morpholinium)-carbinol iodide determined on male mice by per os administration is 558.34 mg./kg. Upon intraperotineal administration the $LD_{50}$ on male mice is 160 mg./kg.

The technique utilized to determine the inhibition action against acetyl choline was the classical method.

A sergment of the terminal ileum from a guinea pig sacrificed by bleeding is removed and placed in a vat containing oxygenated Locke-Ringer's solution and maintained at a constant 30° C. temperature.

Increasing doses of acetyl choline are then introduced into the vat. The intestinal contraction is registered on a cylinder coated with a layer of black smoke.

Between each new application of acetyl choline the preparation is again washed with the Locke-Ringer's liquid.

The progression of the doses of acetyl choline is occasionally interrupted and very weak new doses are given to verify the stability of the responses of the preparation.

After completion of the preliminaries the same operations are repeated, however, instead of using pure Locke-Ringer's solution utilizing Locke-Ringer's solution containing the thienyl phenyl ethyl-(N-methyl morpholinium)-carbinol iodide in various concentrations.

After completion of the tests the reactivity is again verified by means of pure Locke-Ringer's solution.

The tests prove that thienyl phenyl ethyl-(N-methyl morpholinium)-carbinol iodide in doses of 10 gamma per 80 cc. of Locke-Ringer's solution (equivalent to a concentration of 125 gamma per liter) inhibits the action of acetyl choline completely, even when the acetyl choline is introduced in very strong doses.

In a dose of 1 gamma per 80 cc. of Locke-Ringer's solution (equivalent to a concentration of 12.5 gamma per liter) the effect of the thienyl phenyl ethyl-(N-methyl morpholinium)-carbinol iodide is considerably reduced, while with doses of ¼ gamma the effect is lost.

It is clear from these tests that the compound has a considerable antagonistic effect to acetyl choline. The results when repeated show constant effect and the antagonism action against acetyl choline is comparable to the action of atropine used in ⅙ the concentration. However, the product of the present invention is much less toxic than atropine.

Further tests as to the antagonistic action to acetyl choline on isolated auricles prove that the product does not itself modify the cardiac properties.

In testing the compound on the striated muscles of frogs it is found that 1 milligram of the product inhibits the contraction with all concentrations of acetyl choline. The action of thienyl phenyl ethyl-(N-methyl morpholinium)-carbinol iodide in inhibiting the contraction of striated muscles is considerably superior to that of atropine which in the same dose, 1 mg., has no influence even on slight doses of acetyl choline.

Tests on rats prove that thienyl phenyl ethyl-(N-methyl morpholinium)-carbinol iodide, injected intramuscularly, has a vagolytic action which is marked at doses as low as 0.05 mg./kg., while the effective dose of atropine is 30 gamma/kg., i.e. only slightly less than the dose of the product of the present invention.

Further tests on rabbits prove that with a dose of 100 gamma/kg. the excitability of the vagous is considerably diminished while with quantities of 200 gamma or 300 gamma/kg. the effects of even very strong stimulations in the tip of the vagous completely disappears.

In general the action of the thienyl phenyl ethyl-(N-methyl morpholinium)-carbinol iodide in connection with its cardiometric properties is comparable to the action of atropine.

The products of the present invention also has a clear inhibiting action on salivary secretion but this action is slight. Its action on this effect is less marked than in the case of atropine, and likewise, the mydriatic action is less marked than that of atropine.

As mentioned previously the thienyl phenyl ethyl-(N-methyl morpholinium)-carbinol iodide of the present invention also has an anti-spasmodic action as demonstrated by its property of inhibiting contractions on intestines caused by barium chloride. Its action in this respect is greater than that of acetyl choline. This inhibiting action starts at weak doses, with an intravenous injection of 100 gamma causing a complete arrestation of motility in 2 minutes. Its action in inhibiting intestinal motility is one of the most characteristic properties of the thienyl phenyl ethyl-(N-methyl morpholinium)-carbinol iodide of the present invention.

Another important action is that when given intramuscularly it retards the occurrence of asthma crisis which would be provoked by injection of histamines. It should be noted that this is not a criterion of anti-histaminic action but a specific effect of its own.

The compound also has a vasoconstricting action however only in strong concentrations given intravenously, the effect of such injections lasting for a long time.

It should also be noted that the products of the present invention is effective when administered per orally as well as when administered by injection.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A compound selected from the group consisting of thienyl phenyl ethyl morpholyl carbinol and non-toxic quaternary ammonium halide salts thereof.

2. Lower alkyl halide quaternary ammonium salt of thienyl phenyl ethyl morpholyl carbinol.

3. A methyl halide quarternary ammonium salt of thienyl phenyl ethyl morpholyl carbinol.

4. Thienyl phenyl ethyl-(N-methyl morpholinium)-carbinol iodide.

References Cited in the file of this patent
UNITED STATES PATENTS

| | | |
|---|---|---|
| 2,605,209 | Bray | July 29, 1952 |
| 2,680,115 | Ruddy et al. | June 1, 1954 |
| 2,733,241 | Krapcho et al. | Jan. 31, 1956 |
| 2,837,525 | Ruddy et al. | June 3, 1958 |
| 2,853,418 | Smith | Sept. 23, 1958 |
| 2,979,504 | Smith | Apr. 11, 1961 |